Figure 1:
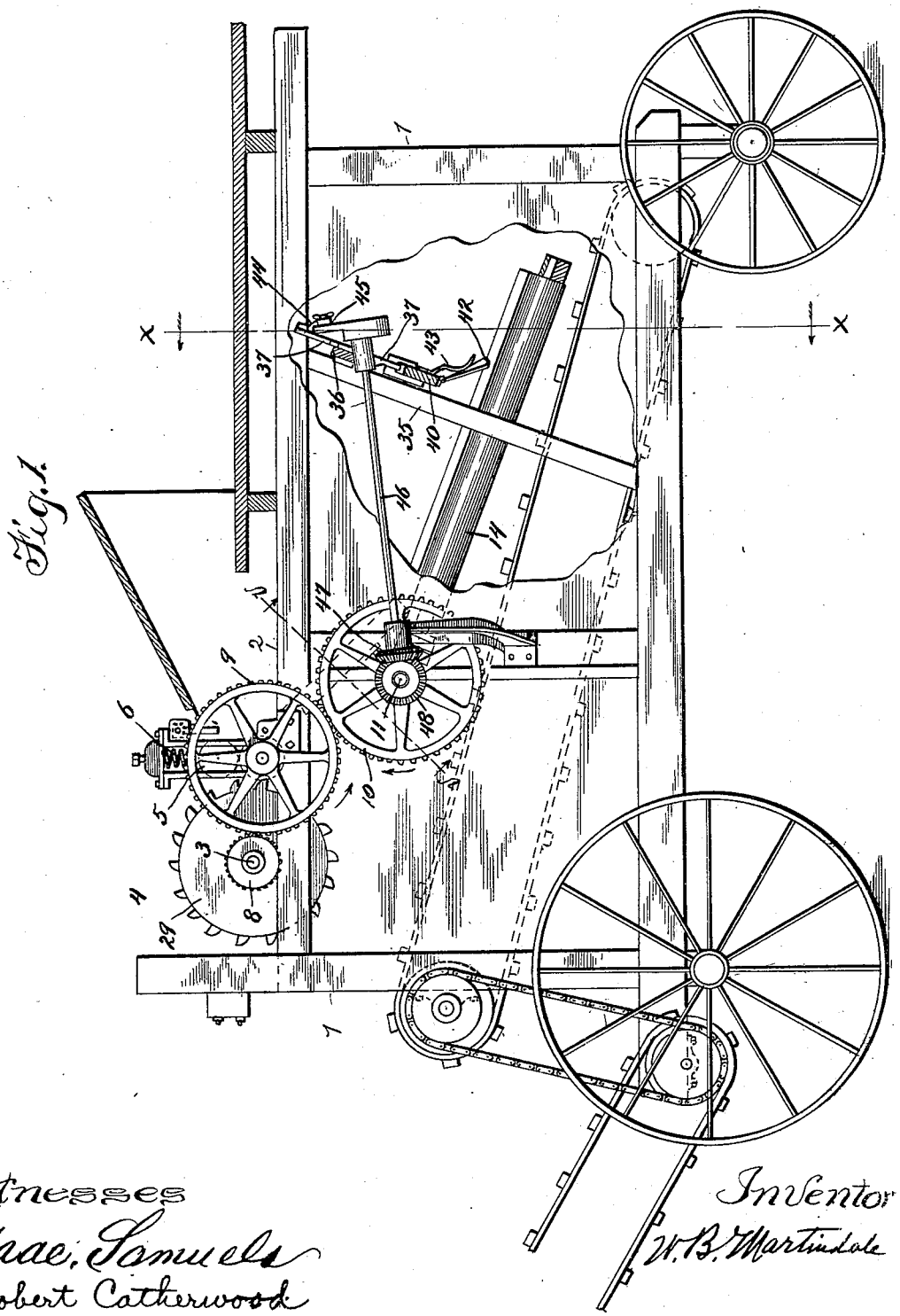

No. 722,429. PATENTED MAR. 10, 1903.
W. B. MARTINDALE.
CORN SHREDDING AND HUSKING MACHINE.
APPLICATION FILED SEPT. 20, 1901.
NO MODEL. 6 SHEETS—SHEET 4.

Witnesses:
Isaac Samuels
Robert Catherwood

Inventor
W. B. Martindale

No. 722,429. PATENTED MAR. 10, 1903.
W. B. MARTINDALE.
CORN SHREDDING AND HUSKING MACHINE.
APPLICATION FILED SEPT. 20, 1901.
NO MODEL. 6 SHEETS—SHEET 5.
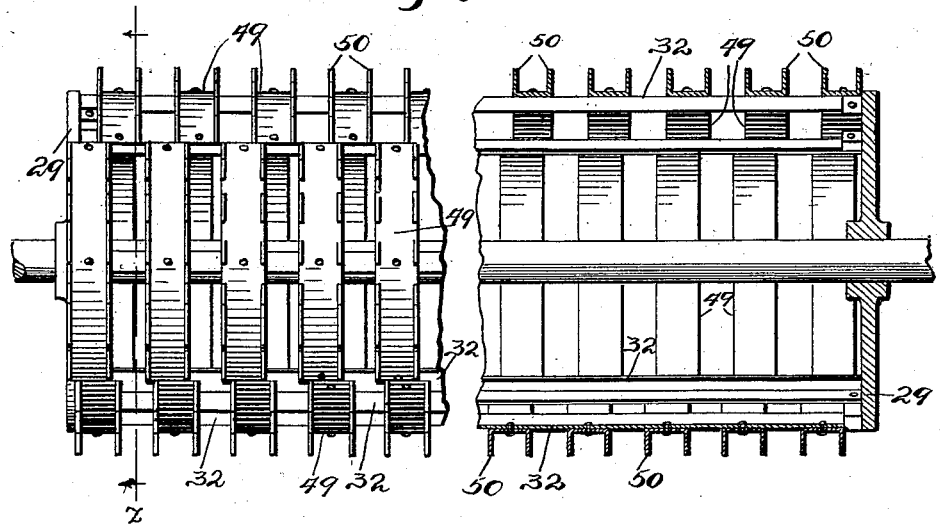
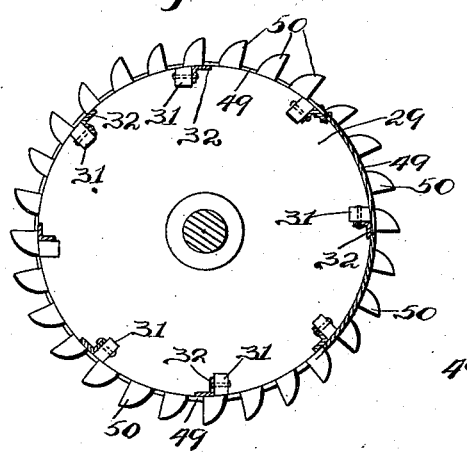

UNITED STATES PATENT OFFICE.

WARREN B. MARTINDALE, OF ROCHESTER, INDIANA, ASSIGNOR TO CORN KING HUSKER COMPANY, OF ROCHESTER, INDIANA, A CORPORATION OF INDIANA.

CORN SHREDDING AND HUSKING MACHINE.

SPECIFICATION forming part of Letters Patent No. 722,429, dated March 10, 1903.

Application filed September 20, 1901. Serial No. 75,951. (No model.)

*To all whom it may concern:*

Be it known that I, WARREN B. MARTINDALE, of Rochester, in the county of Fulton and State of Indiana, have invented certain new and useful Improvements in Corn Shredding and Husking Machines, of which the following is a full, clear, and exact description, reference being had to the accompanying drawings, which form a part of this specification.

My invention relates to corn shredding and husking machines; and my objects are to provide a simple and improved form of shredding-cylinder, to provide means for immediately relieving any congestion or tendency to clogging by reason of the stoppage or accumulation of material in front of the snapping-rolls, and thereby avoid the danger incident to an attempt to remove such obstructions by hand, and also to provide improved means for causing the ears of corn to be brought into proper contact with the husking-rolls to cause said rolls to grasp and remove the husks, thereby preventing any of the ears from passing over the rolls without being husked, while permitting of the use of shorter teeth in said rolls and reducing to a minimum the percentage of corn shelled in the process of husking.

While I believe myself to be the first to discover and apply any effective means in combination with snapping-rolls for mechanically removing obstructions to the entrance between said rolls, I am aware that rakes arranged to vibrate transversely of the path of the grain have been employed for distributing small grain in self-feeding devices for threshing-machines. I make no claim to such construction nor the object designed to be accomplished thereby. The purpose, manner of construction, and method of operation of my invention are entirely distinct therefrom, the purpose of my invention being to avoid the danger of accidents resulting from attempts to remove obstructions from the entrance to the snapping-rolls of a corn shredding and husking machine, to assist the rolls in snapping the ears of corn from the stalks, and to increase the feeding capacity of the machine. I accomplish this object by the employment of rigid teeth or serrations, in combination with and in close proximity to said snapping-rolls, whereby the rolls and teeth coact together in the removal of such obstructions, said serrations or teeth being located immediately in front of the snapping-rolls and slightly above and below the plane of their meeting faces have no effect on stalks passing normally in their course, but only operate to agitate any undue accumulation of material in front of said rolls, and thereby assist the rolls in the removal thereof.

Various means have been employed for pressing the ears of corn against the husking-rolls, all of which are more or less complicated and cumbersome and none of which are capable of producing as satisfactory results as are obtained by my improvement. What I regard as the best means for accomplishing these results is hereinafter more specifically set forth and the novel features thereof designated in the claims.

Figure 2:
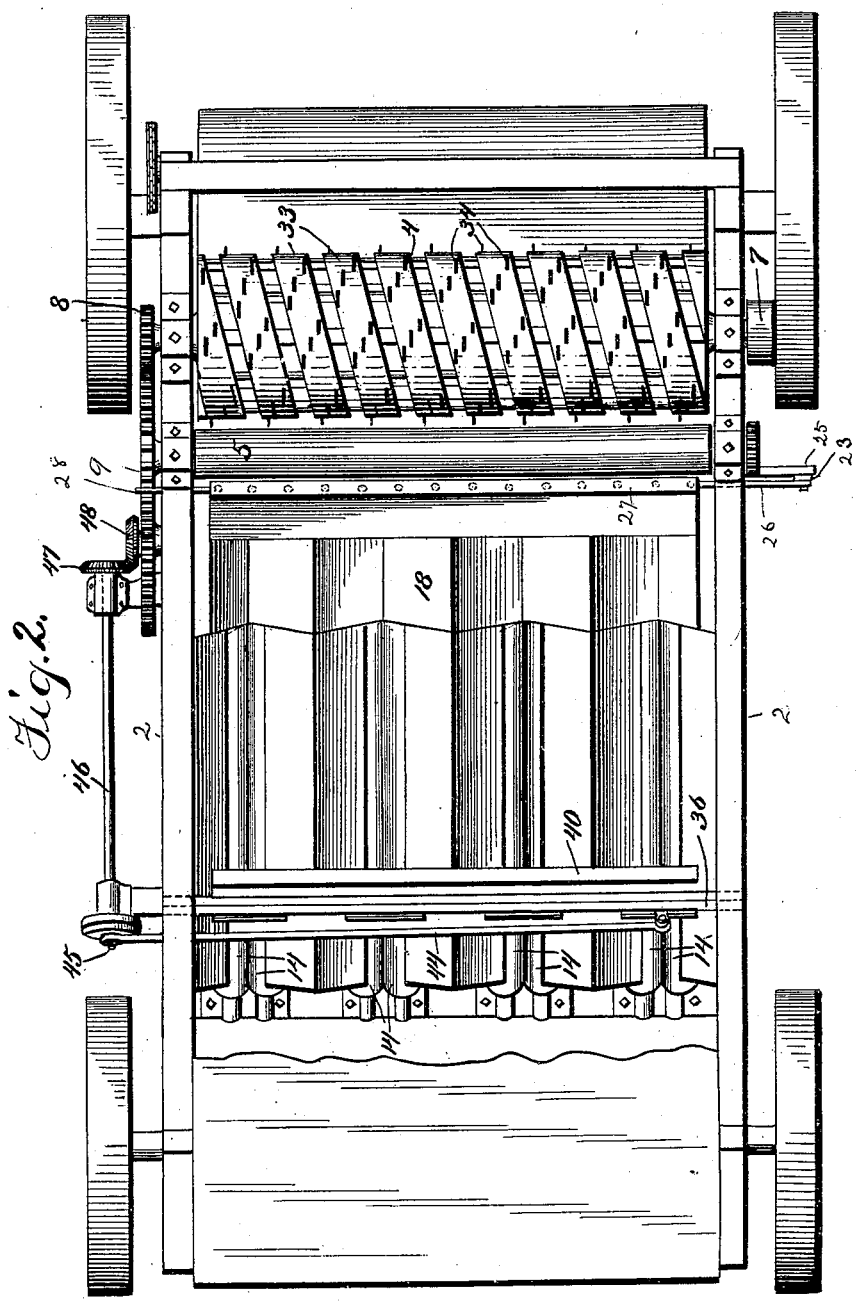
Figure 3:
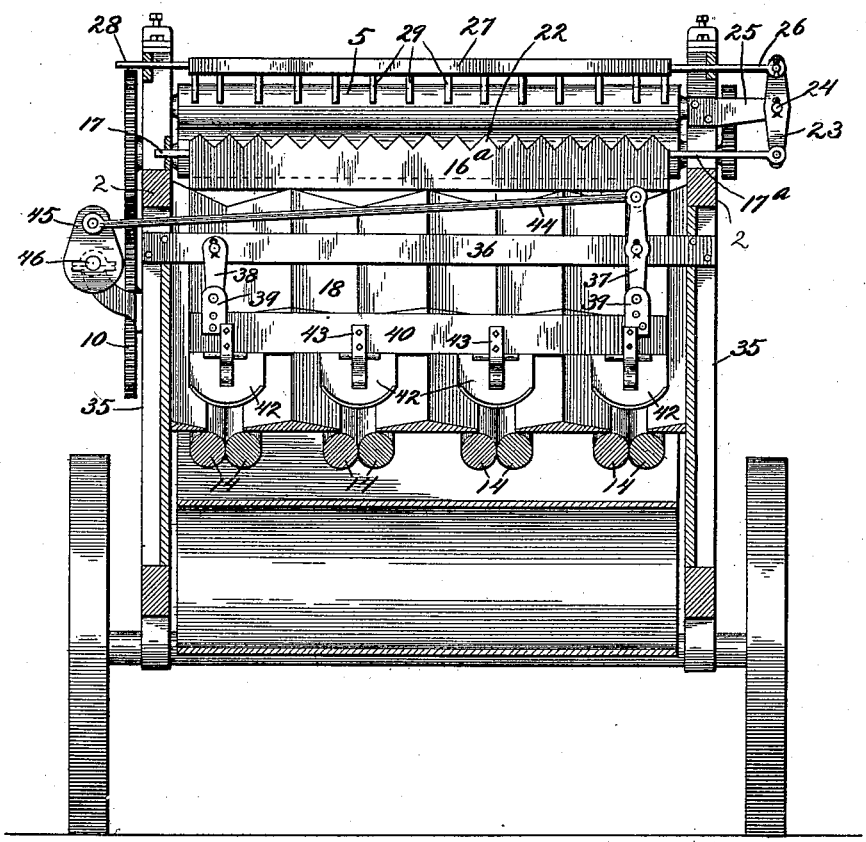
Figure 4:
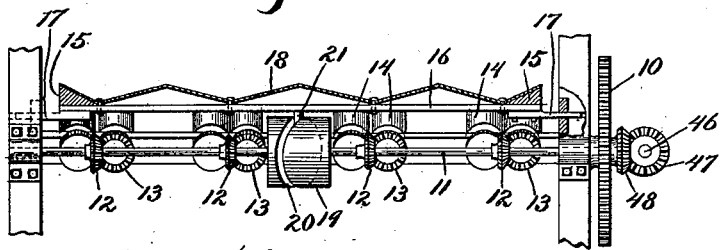
Figure 5:
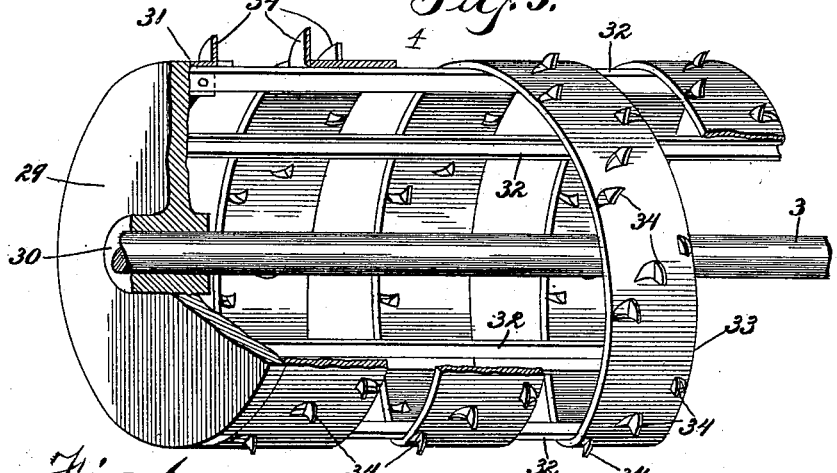
Figures 6, 7:
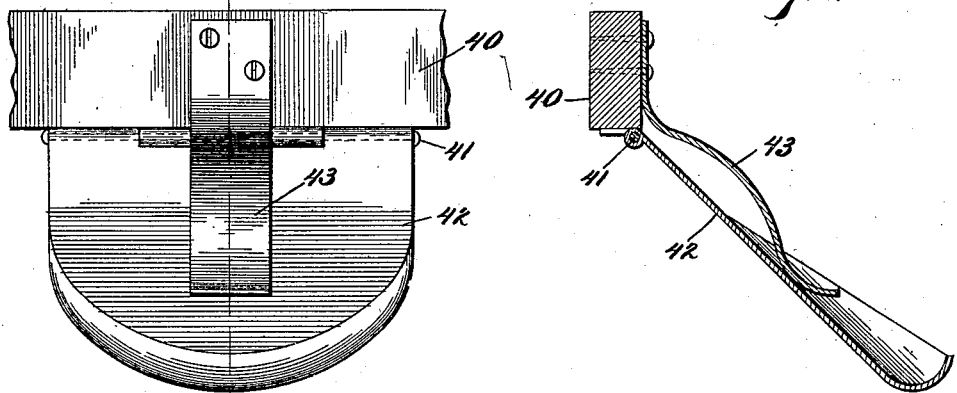
Figure 12:
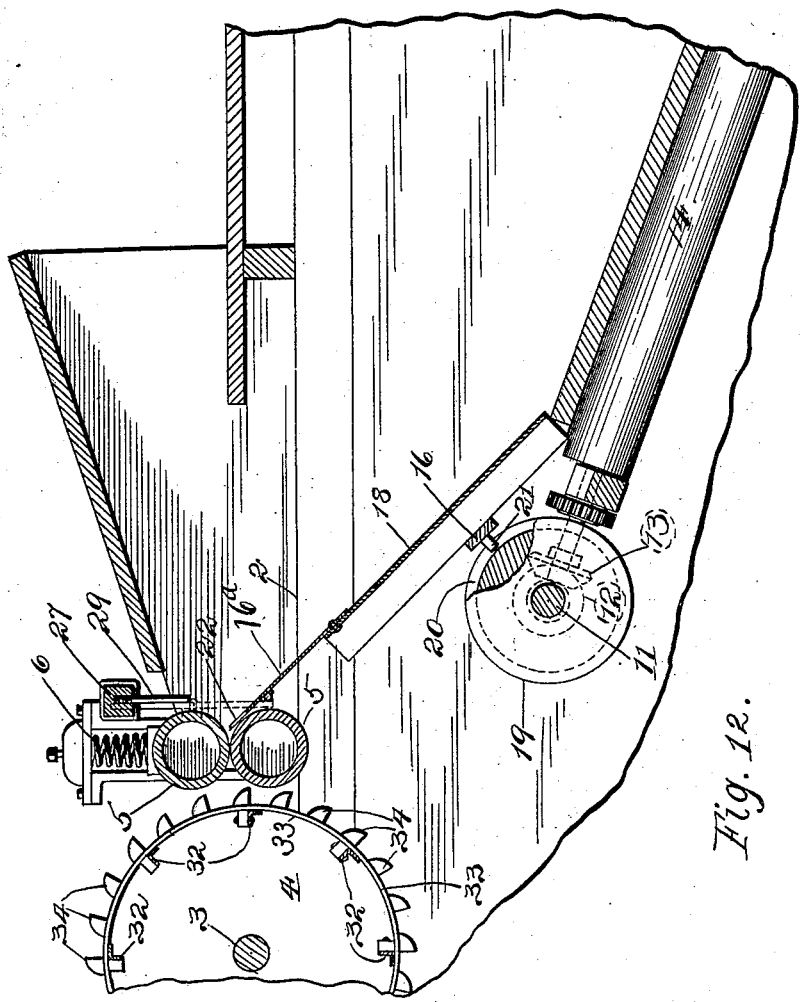

In the drawings, Figure 1 is a side elevation, partly in vertical section and partly broken away, of a machine embodying the features of my invention. Fig. 2 is a plan view thereof, the top being removed to show the working parts. Fig. 3 is a transverse vertical sectional view taken upon the line $x\,x$, Fig. 1. Fig. 4 is a vertical sectional view in detail taken upon the line $v\,v$, Fig. 1. Fig. 5 is an enlarged perspective view, partly in section, of a portion of my improved cylinder. Fig. 6 is a face view of one of the yielding pressure-pads employed in connection with the husking-rolls. Fig. 7 is a vertical sectional view thereof, taken upon the line $y\,y$, Fig. 6. Fig. 8 is a front view, partly in central section, of a modified form of cylinder. Fig. 9 is a transverse sectional view thereof, taken upon the line $z\,z$, Fig. 8. Fig. 10 is a detail view showing one of the sheet-metal blanks from which the tooth-supporting body and teeth are formed. Fig. 11 is a detail view in perspective of a portion of one of the sheet-metal tooth-bearing sections, and Fig. 12 is a central vertical sectional view of a portion of the machine intended more especially to show the relative position of the snapping-rolls and vibratory rakes or shakers for relieving any tendency to congestion or clogging in front of the snapping-rolls.

Like reference-numerals in the different figures designate corresponding parts.

The frame 1 of the machine, as will be seen by the drawings, is provided with horizontal bars 2 2 at the top and extending lengthwise thereof, upon which are mounted bearings for the shaft 3 of a shredding-cylinder 4, in front of which is located the usual feed or snapping rolls 5 5, with the upper one of which is connected compression-springs 6, arranged to operate in the customary manner. A pulley 7, Fig. 2, mounted upon the cylinder-shaft, serves to drive the latter, while a pinion 8, keyed to the opposite end of said shaft, is adapted to actuate the lower snapping-roll by means of a spur-gear 9, into which it meshes. A spur-gear 10, meshing into the gear 9, is mounted upon and serves to drive a shaft 11, having keyed thereto a series of beveled gears 12, Fig. 4, which engage with corresponding gears 13, arranged in the usual way to drive the husking-rolls 14, which are arranged parallel to each other and connected in pairs by means of gears in the usual way, so as to be rotated in opposite directions.

I will first describe my improved means for instantly relieving congestion or clogging of the stalks or ears of corn immediately in front of the snapping-rolls, next the construction of my improved shredding-cylinder, and, finally, my improved means for pressing the ears of corn against the husking-rolls.

Located immediately in front of the snapping-rolls and inclined downwardly is an apron consisting of a framework having inclined longitudinal side pieces 15 15, Fig. 4, rigidly attached to cross-bars 16 16$^a$, the former of which is shown in said figure and the latter in Fig. 3, said cross-bars having lateral end projections 17 17$^a$, which are loosely supported in sliding bearings, as shown, in the framework. Attached to said framework is a sheet-metal covering 18, which forms the apron proper, the same being corrugated or grooved, as shown, the lower portion or valleys of said grooves being in the vertical planes, respectively, of the spaces between the several pairs of husking-rolls, the object being that when the ears of corn fall upon the apron from the snapping-rolls they will thereby be guided into proper alinement with the husking-rolls. Keyed to the shaft 11 is a cam 19, Figs. 4 and 12, the groove 20 of which is in engagement with a pin 21, rigidly attached to and depending from the cross-bar 16. The entire apron and frame is free to move laterally and is adapted to be vibrated by the action of the cam when the shaft is rotated. The cross-bar 16$^a$ at the upper end of the apron is provided with teeth 22, Figs. 3 and 12, the points of which extend upwardly to the horizontal plane immediately in front of and below the meeting faces of the snapping-rolls. One of the extensions 17$^a$ is pivotally attached to one end of a vibratory lever 23, pivoted at 24 to a bracket 25, rigidly attached to the frame. The other end of the lever-arm 23 is pivotally attached to a supporting-rod 26, which serves to support one end of a cross-bar 27, the other end of which is supported by means of a similar rod 28, said rods 26 and 28 being adapted to slide in suitable bearings in the frame. The cross-bar 27 is provided with depending teeth 29. As the apron, and with it the serrated bar 16$^a$, is vibrated the lever-arm 23 is actuated, and through it the toothed bar or rake 27, said bar being moved in opposite directions. The result of this action is that as the stalks are fed into the rolls any tendency toward congestion or clogging in the snapping-rolls is immediately relieved by the agitation produced by the positive lateral movement of said teeth.

While I have shown two serrated bars, one above and the other below the stalks as they are fed to the rolls, I preferably employ but one, that below the pathway of the stalks producing the most satisfactory results. While I have shown two forms of teeth, I do not confine myself to either or to both combined, as the form may be varied without departing from the principle involved.

The shredding-cylinder 4, Figs. 1, 2, and 5, forms another novel feature of my invention. It consists of heads or end disks 29, having hubs 30, which are keyed to the shaft 3. Bolted, as shown at 31, Fig. 5, to suitable lugs formed upon said heads are parallel angle-irons 32, which serve not only to connect the two heads, but as supports for a sheet-metal strip 33, which is rigidly connected to one of said heads at one end, from whence it is wrapped in a spiral form around the bars 32, as clearly shown, and connected in like manner to the other head. Teeth 34 are cut from the sheet-metal strip and bent outwardly at right angles thereto. This construction is obviously simple and cheap, as well as strong and durable.

I will now describe my improved means for bringing the ears of corn into operative contact with the husking-rolls 14.

Attached to the bars 25 25 upon opposite sides of the frame is a rigid horizontal cross-bar 36, upon which is pivoted a shaking-lever 27 and a suspending link connection 38, the ends of which are pivotally connected with lugs 39 39, bolted to a horizontal bar 40, Figs. 1, 2, 3, 6, and 7. Hinged to the lower edge of the bar 40, as more clearly shown at 41, Figs. 6 and 7, are a series of sheet-metal plates or pads 42, the lower edges of which are rounded and provided with upwardly-bent flanges. Said pads conform in number to that of the several pairs of husking-rolls and are located above the same, the center line of a pad when in its normal position being in the vertical plane between the two coacting rolls. A flat bent spring 43 has one end rigidly attached, by means of screws or bolts, to the face of the bar 40, while the free end is in engagement with and serves to press down upon the hinged pad 42. The upper end of the lever-arm 37 is connected, by means of a pitman 44, to a crank 45 upon a shaft 46, having a beveled gear 47 upon one end in operative engagement with a like gear 48 upon the shaft 11. The rotation of the crank serves to impart a vibratory motion to the lever-arm 37, thereby actuating the bar 40, to which is imparted an oscillatory motion partaken of in turn by the spring-depressed pads 42, which are pressed downwardly with a yielding pressure against the husking-rolls 14. As the ears of corn pass downwardly over the husking-rolls they are engaged by the spring-pads, which oscillate over and at the same time press them down into contact with the rolls in such a way that the husks are grasped by the rolls and removed.

In Figs. 8 to 11, inclusive, I have shown a modified construction of cylinder in which the shaft 3, heads 29, and angle-iron supports 32 are substantially the same as in that above described; but in lieu of the continuous sheet-metal band 33 I have substituted a series of sheet-metal sections 49, having teeth 50, which are formed upon the edge of a sheet-metal strip, as shown in Fig. 10, and then bent at right angles thereto, as shown in Fig. 11, after which the strips are bolted or riveted to the angle-iron supports 32, preferably in the manner shown—that is to say, a portion or all of one strip is placed opposite the space between the strips, at one end of which it is placed. This causes the teeth to be so located that those upon one section will follow in a different path from those of the next or preceding section. An obvious advantage of this construction is its cheapness and the fact that new sections can readily be substituted in case of breakage.

Having thus described my invention, what I claim as new, and desire to secure by Letters Patent, is—

1. The combination, with the snapping-rolls of a corn husking and shredding machine, of a cylinder consisting of suitable heads mounted upon a shaft, longitudinal bars connecting said heads at their peripheries, and a sheet-metal strip wound spirally around said bars from one cylinder-head to the other, said strip being attached to said supporting-bars and provided with outwardly-projecting teeth cut therefrom.

2. The combination with the snapping-rolls of a corn husking and shredding machine, of a cylinder consisting of suitable heads mounted upon a shaft, longitudinal bars connecting said heads at their peripheries and a sheet-metal strip wound spirally around said bars from one cylinder-head to the other with an intervening space between the respective convolutions, said strip being attached to said supporting-bars and provided with outwardly-projecting teeth cut therefrom.

3. The combination with the snapping-rolls of a corn shredding and husking machine, of means for supplementing the action of said snapping-rolls and preventing the clogging thereof, consisting of a series of teeth or serrations mounted upon a movable support and arranged parallel with, in front of and in close proximity to the meeting faces of said snapping-rolls, and means for actuating the same to coact with said rolls in removing the ears of corn from the stalks, and to prevent by agitation an abnormal accumulation of material in front of the rolls and the consequent clogging thereof.

4. The combination with the snapping-rolls of a corn shredding and husking machine, of two sets of rigid serrations or teeth, each set being mounted upon movable supports, and arranged parallel with, in front of and in close proximity to the meeting faces of said snapping-rolls, one of the sets of teeth or serrations being above and the other below the plane of the meeting faces of said rolls, and means for actuating same to enable said teeth to coact with the said snapping-rolls in removing the ears of corn from the stalks and to prevent by agitation an abnormal accumulation of material in front of the rolls and the consequent clogging thereof.

5. The combination with the snapping and husking rolls of a corn husking and shredding machine, of an apron having valleys or corrugations therein in alinement with the acting faces of said husking-rolls, a series of serrations or projections at the upper edge of said apron, said serrations being arranged below the horizontal plane of the meeting faces of and parallel with said snapping-rolls and in front of and in close proximity thereto, and means for imparting a lateral movement to said apron, substantially as and for the purposes herein described.

6. The combination with the snapping and husking rolls of a corn shredding and husking machine, of a horizontal bar arranged transversely of said husking-rolls and above the same, means for supporting said bar whereby it may be moved back and forth longitudinally, means for oscillating the same longitudinally and a series of spring-controlled presser-pads depending therefrom, located approximately in the several vertical planes of the acting faces of said husking-rolls, whereby an oscillatory movement across and above said rolls may be imparted to said presser-pads and the ears of corn brought into contact with the rolls with a yielding pressure.

7. The combination with the husking-rolls of a corn shredding and husking machine, of a cross-bar arranged above and transversely of said rolls, means for suspending said bar whereby it may swing longitudinally in the arc of a circle, means for oscillating said bar longitudinally, and a series of spring-actuated presser-plates hinged to said bar, whereby the ears of corn to be husked may be pressed thereby with a yielding pressure, alternately applied in opposite directions above the rolls to insure an operative contact between the ears and husking-rolls, substantially as and for the purpose herein described.

8. The combination with the snapping and husking rolls of a corn husking and shredding machine, of an apron having valleys, corrugations or troughs therein in substantial alinement respectively with the acting faces of said husking-rolls, and means for imparting to said apron a vibratory movement in a direction transverse to the axes of said husking-rolls, whereby bunching of the ears of corn may be avoided and said ears straightened and presented longitudinally to the husking-rolls.

In testimony whereof I have signed this specification, in the presence of two subscribing witnesses, this 18th day of September, 1901.

WARREN B. MARTINDALE.

Witnesses:
 ISAAC SAMUELS,
 ROBERT CATHERWOOD.